Patented Dec. 18, 1951

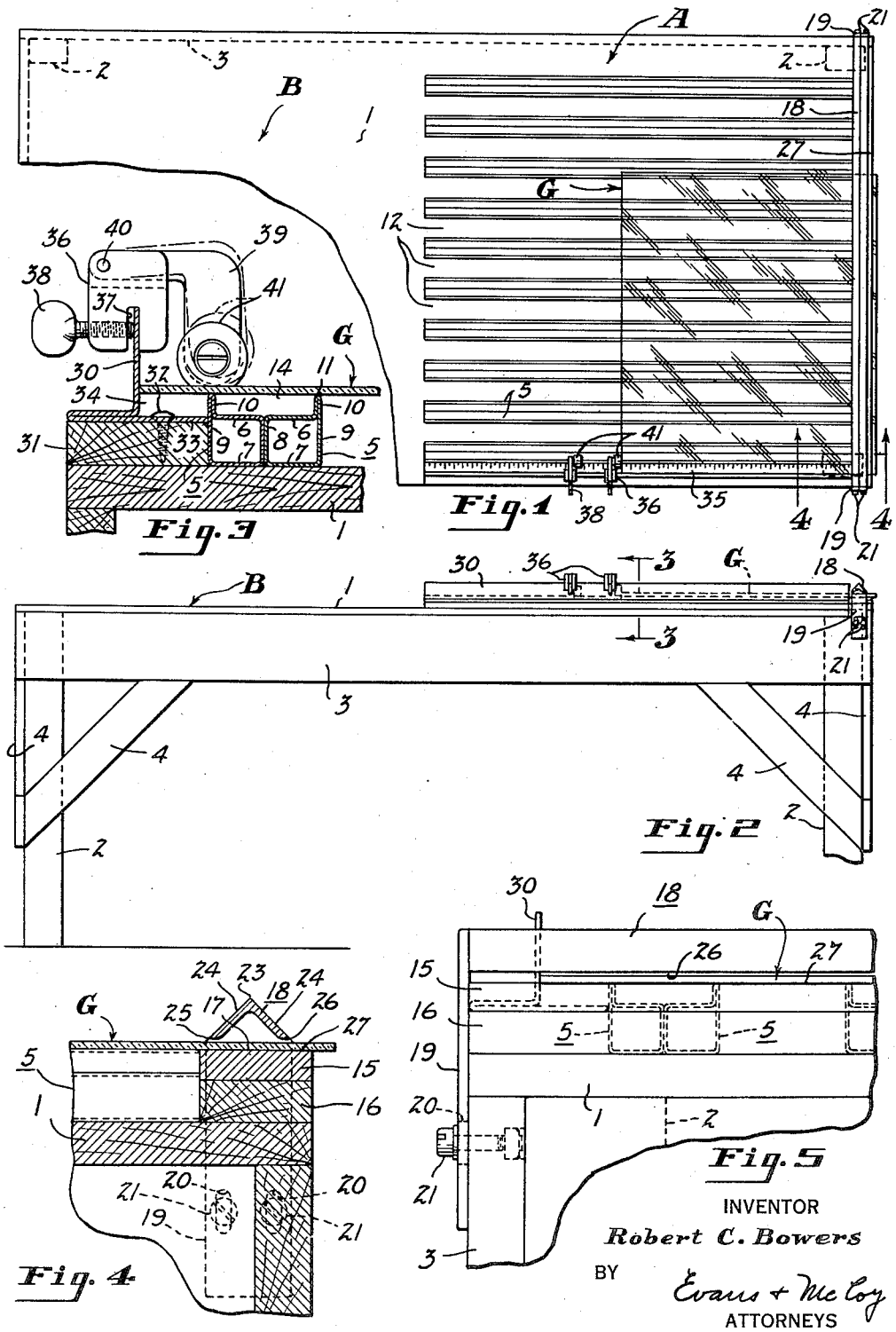

2,578,919

UNITED STATES PATENT OFFICE 2,578,919

GLASS-CUTTING TABLE

Robert C. Bowers, Cuyahoga Falls, Ohio, assignor to The F. C. Russell Company, Cleveland, Ohio, a corporation of Ohio Application November 5, 1947, Serial No. 784,267

15 Claims. (Cl. 33—76)

This invention relates to the design and construction of tables or benches for cutting or processing sheets of glass and like materials.

In the cutting of brittle sheet material such as plate and window glass, particularly in the cutting of such sheets in large quantities as in the commercial manufacture of windows, considerable glass dust or grit accumulates on and about the work table. The small particles of glass act abrasively when brought into contact with the surface of the glass sheets and have a tendency to scratch or otherwise mar such sheets.

It is therefore one of the principal objects of the present invention to provide an improved glass cutting table and cutter guide especially suited for commercial glass cutting operations, the table being arranged to support glass being cut above and out of contact with glass dust, grit, and other foreign particles that might accumulate on and about the table.

Another object is to provide a glass cutting or processing table having relatively thin elements for contacting and supporting glass sheets, such elements being provided with smooth straight edges which afford uniform non-scratching supports for the glass sheets.

Another object of the invention is to provide glass supporting elements of tubular form, the elements having integral reversely bent portions forming glass contacting flanges of relatively great strength.

A further object is to provide a glass cutting table incorporating a cutting guide so shaped as to minimize the accumulation of glass particles and grit thereon and which provides a cutter guiding edge disposed closely adjacent the surface of the glass to be cut with a clear space above and laterally on both sides of the guiding edge to facilitate the manipulation of glass cutting tools by an operator.

A still further object of the invention is to provide a table of the character mentioned which incorporates both a bulk glass storage zone and a glass processing zone and has means adjacent the latter zone for guiding a glass cutting tool. As a further refinement the table includes a barrier to interrupt or impede the movement of glass particles and grit from a glass cutting region to a glass supporting portion of the processing zone.

Other objects and advantages relating to details of construction and arrangements of parts will become apparent as the following detailed description of a glass cutting table embodying the principles of the present invention proceeds. This description is made in connection with the accompanying drawings forming a part of this specification and in which like parts throughout the several views are indicated by the same numerals of reference.

In the drawings:

Figure 1 is a plan view, with parts broken away and removed, of a glass cutting table suitable for use in the large scale processing or cutting of glass sheets, as in the manufacture of windows;

Fig. 2 is a front elevational view of the table, parts being broken away and removed;

Fig. 3 is a sectional detail taken substantially on the line 3—3 of Fig. 2 and enlarged with respect to that figure;

Fig. 4 is a sectional detail taken substantially on the line 4—4 of Fig. 1 and enlarged with respect to that figure; and Fig. 5 is a fragmentary elevational detail showing one end of the cutting guide.

The table comprises a top 1 which is of rectangular plan form and may be of heavy plywood, as shown, or made up of a number of separate planks or cross bars. The top is mounted horizontally on a supporting frame structure which includes corner uprights or legs 2, cross members 3, and angled reinforcing pieces 4.

The table surface is divided approximately equally into work zone A and storage zone B. Glass sheets to be cut are placed in bulk on the storage zone portion and are withdrawn therefrom one at a time and moved onto the work zone A for cutting. In the cutting zone the individual glass sheets are shifted about to orient them in the desired direction. The shifting about of a glass sheet on a flat table or surface is apt to result in scratching or marring of the surface of the glass if grit, glass particles, or chips become lodged between the glass sheet and the supporting surface.

To avoid the marring and scratching of glass sheets being manipulated on the work zone of the table, the latter comprises a number of tubular glass supporting elements 5 preferably arranged in pairs disposed in parallel relation to one another. Each of the elements is of generally rectangular cross section having top and bottom walls 6 and 7 and side walls 8 and 9. All of the walls of the tubular elements are connected by integral right angle bends except the top walls 6 and the side walls 9 which are formed with integral extension portions providing upstanding flanges 10 disposed approximately in the planes of the side walls 9. The flanges 10 are each of double wall construction, being U-shaped in cross section and having a reverse bend 11 along the upper edge of the flange which contacts the underside of a glass sheet disposed on the work zone of the table.

The elements are arranged with the side walls 8 of each pair disposed in contacting relation and with the glass supporting flanges 10 projecting upwardly, the glass contacting edges or reverse bends of the flanges of all of the elements being disposed approximately in a common horizontal plane. The reversely bent edges 11 provide smooth straight surfaces for contacting the underside of a glass sheet supported thereby. The edges have a wiping action on the surface of the glass to remove from the latter any glass grit or other particles apt to scratch the glass sheet. Grit and particles so removed by the flanges 10 drop down into spaces 12 between adjacent pairs of the glass supporting elements 5, or into spaces 14 between the flanges 10 of the glass supporting element pairs.

Across one end of the table, the right-hand end as viewed in Figs. 1 and 2, is disposed a bed member or bar 15 preferably of metal, which is supported by a wooden spacing block 16 so that top surface 17 of the bar lies approximately in the plane of the glass supporting edges of the flanges 10. The bed bar 15 extends across the entire width of the table to provide a continuous support for a sheet of glass moved thereonto.

A conventional glass cutting tool, not shown, may be drawn across the face of a glass sheet above the bed bar 15 to score or etch the glass so that the latter may be broken or cut through in the usual manner. To guide a cutting tool along the bar 15 a steel angle member 18 is supported in spaced relation above the bed bar 15 by upright metal plate elements 19 secured to the cross members 3 on opposite sides of the table. The uprights 19 are welded to the ends of the guide member 18 and are formed with vertically elongated slots 20 which receive fastening bolts or screws 21 that pass into or through the table cross members 3.

The guide bar 18 is disposed with the flanges inclined at obtuse angles to the glass supporting plane of the table and with corner 23 uppermost. Thus faces 24 of the guide bar flanges are shaped or obtusely angled with respect to the glass supporting plane of the table. These angularly disposed adjacent faces of the guide shed grit and glass particles that fall thereon. Edges 25 and 26 of the guide flanges are disposed to closely overlie the upper surface of a glass sheet G resting on the bed bar 15. The elongated slots 20 in the upright supports 19 provide for vertical adjustment of the guide bar to accommodate sheet glass of different thicknesses.

As shown in Fig. 4, the distance across the guide bar 18 between the edges 25 and 26 thereof is less than the width of the bed bar 15. On the work or cutting side of the guide bar 18 the bed bar 15 projects beyond the guide edge 26 providing a surface portion 27 which receives the pressure of a cutting tool drawn along the guide edge 26.

Along a side edge of the table, at 90° or other desired angle to the guide bar 18 is an upstanding guide fence or rail 30 which may be formed of a strip of sheet metal bent or rolled to T shape in cross section and supported on a wooden spacer 31, being secured thereto as by screws 32. The spacer strip 31 is nailed or otherwise attached to table top 1 and both bottom flange 33 of the guide fence 30 and the spacing strip 31 abut the side of one of the glass supporting elements 5. The base flange 33 of the guide 30 is below the glass supporting plane of the rolled edges 11 of the flanges 10 providing a space 34 into which fall glass particles or grit, to prevent the latter from coming in contact with the surface of glass sheets being processed on the table.

A scale 35 inscribed on the upper surface of the base flange 33 of the guide rail indicates distances from the tool guiding edge 26 of the guide 18 and the rail projects upwardly above the level of the glass supporting edges 11 of the flanges 10 to intercept and limit the movement of glass shifted about on the table.

Guide stops are mounted on the rail 30 for use in locating glass sheets in predetermined positions on the table top when cutting a number of sheets to the same dimensions. The guide stops, more fully described in co-pending application for United States Patent Serial No. 784,191, filed November 5, 1947 and entitled Gauge Stop, comprise a body member 36 formed with a slot 37 which receives the upper edge of the rail 30 for sliding movement of the guide stop therealong. A thumb screw 38 threaded through the body 36 is arranged to bear against the rail 30 to clamp the guide stop in adjusted position. An L-shaped arm 39 pivoted on a pin 40 carried by the body 36, has a depending arm portion which mounts a wide roller 41. The roller 41 normally rests by gravity on the upper edge 11 of one of the glass supporting flanges of the table so that a glass sheet moved along the guide fence 30 is arrested in predetermined position on the work zone A of the table when the edge of the glass sheet engages the wheel or roller. The roller is also arranged to ride over the edge of a sheet of glass that is so manipulated on the flanges 10 of the table as to move against the roller in a direction toward the guide rail 30.

A number of the guide stops may be mounted at intervals along the rail 30 for use in locating glass sheets in different positions on the work zone of the table top. Thus the table can be utilized in cutting glass sheets into different sizes, the dimensions of the sheets desired being "set up" by means of the adjustable stops, the rollers of those stops that are located between the particular measuring stop being used and the cutter guide 18 merely riding up on the sheet as the latter is moved against the rail 30.

The glass supporting elements of the present invention, arranged as they are in pairs, lend mutual support to one another to resist lateral collapse under load. Furthermore, the relatively deep gullies or troughs 12 between adjacent pairs of the elements tend to keep the underside of a glass sheet moved about on the work zone relatively free of glass grit and the like which might be blown or disturbed if shallower troughs were employed. The tubular construction of the glass supporting elements provides for reinforcement of the flanges 10 which are of less height than the side walls of the tubes, the flanges being approximately half the tube wall height while yet providing full depth for the grit receiving gullies or channel spaces 12.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A glass processing table comprising a plurality of glass supporting elements and means mounting the same in spaced relation, each element including a metal strip having a reverse bend therein, the bends of all of the elements being disposed substantially in a common plane for concurrent contact with a sheet of glass being processed, and a cutting guide having angularly disposed flange elements supported on the mounting means transversely to the glass supporting elements and above the glass contacting plane, the flange elements of the guide having free edges disposed closely adjacent said plane.

2. A glass processing table comprising a plurality of glass supporting elements and means mounting the same in spaced relation, each element being a metal tube having a flange extending therefrom, the edges of the flanges of all of the elements being disposed substantially in a common plane for concurrent contact with a sheet of glass being processed.

3. A glass processing table comprising a plurality of glass supporting elements and means mounting the same in spaced relation, each element being a tube of sheet metal having a portion formed with a reverse bend providing an upwardly extending flange on the tube, the edges of all of the tube flanges being disposed substantially in a common plane for concurrent contact with a sheet of glass being processed.

4. A glass processing table comprising a plurality of glass supporting elements and means mounting the same in spaced relation, each element being a tube of sheet metal having a reversely bent portion forming a flange extending longitudinally of the tube, the edges of the several tube flanges being disposed substantially in a common plane for concurrent contact with a sheet of glass being processed.

5. In a glass processing table, a frame structure and a plurality of glass supporting elements mounted on the structure in pairs, each element being a metal tube of substantially rectangular section having an integral flange extending upwardly from one side thereof, other sides of the tubes of each pair being disposed against one another for mutual support, and the edges of the flanges of the several elements being disposed substantally in a common plane for concurrent contact with a sheet of glass being processed.

6. A glass processing table comprising a plurality of glass supporting elements and means mounting the same in spaced relation, each element being a sheet metal tube of substantially rectangular section having a flange extending therefrom, the flange being disposed substantially in the plane of one side of the tube, and the edges of the flanges of all of the elements being disposed substantially in a common plane for concurrent contact with a sheet of glass being processed.

7. In a glass processing table, a frame structure and a plurality of glass supporting elements mounted on the structure in pairs, each element being a metal tube of substantially rectangular cross section having an integral portion reversely bent providing an upwardly extending flange, the flange being disposed substantially as an extension of one side of the tube and another side of the tube being disposed for mutual support against the like side of the tube element paired therewith, and the edges of the flanges of the several elements being disposed substantially in a common plane for concurrent contact with a sheet of glass being processed.

8. A glass processing table comprising a frame structure and a plurality of elongated sheet metal elements mounted on the structure in spaced relation, said elements being attached to the structure independently of one another and each element including a reversely bent portion providing a rounded glass contacting edge, the edges of the elements being disposed substantially in a common plane for simultaneously contacting and supporting a glass sheet being processed on the table.

9. A glass processing table comprising a frame structure and a plurality of elongated sheet metal elements mounted on the structure in spaced relation, said elements each being in the form of a hollow tube having an integral reversely bent portion providing a rounded glass contacting edge, the edges of the elements being disposed substantially in a common plane for simultaneously contacting and supporting a glass sheet being processed on the table.

10. A glass processing table comprising a frame structure and a plurality of tubular sheet metal elements each having a longitudinally extending reversely bent portion providing a glass contacting edge, the elements being mounted on the structure in pairs, the elements of each pair being substantially abutted against one another, the edges of the elements being disposed substantially in a common plane for simultaneously contacting and supporting a glass sheet being processed on the table.

11. A glass processing table comprising a frame structure, a plurality of glass supporting elements mounted on the structure and having glass contacting parts disposed substantially in a common plane, an elongated member having angularly disposed adjacent faces extending along its length, and means secured to the structure and connected to the elongated member for supporting the latter in generally parallel relation above said plane, each of said faces being inclined toward said plane at an oblique angle, and said faces each terminating in a substantially straight edge disposed relatively closely adjacent said plane for guiding cutters over glass sheets supported on the elements, said edges of the guide faces being spaced above the top surface of a supported glass sheet in the provision of clearance between the guide and the sheet.

12. A glass processing table comprising a frame structure, a plurality of glass supporting elements mounted on the structure and having glass contacting parts disposed substantially in a common plane, an elongated metal angle member, and means secured to the structure and connected to the elongated member for supporting the latter in generally parallel relation above said plane, said member having intersecting side faces each disposed at an obtuse angle to said plane, the lowermost edges of said intersecting faces being spaced above the top surface of a sheet of glass supported on the elements, and the intersection of said faces with one another being uppermost.

13. A glass processing table comprising a frame structure, a plurality of glass supporting elements mounted on the structure and having glass contacting parts disposed substantially in a common plane, an elongated metal bar member of substantially L section comprising integral angularly disposed intersecting flange elements having substantially straight edges generally parallel to one another, and means secured to the structure and connected to the elongated metal member at its ends for supporting the metal member above said plane with one of the straight edges relatively close to such plane for guiding contact with a cutter drawn over a supported glass sheet, the one straight edge being spaced above the top surface of a supported glass sheet in the provision of clearance between the guide and the sheet.

14. A glass processing table comprising a frame structure, a plurality of elongated glass supporting elements mounted on the structure in generally parallel relation, said elements having glass contacting edges disposed substantially in a common plane, an elongated member having angularly disposed intersecting adjacent faces extending along its length, and means secured to the frame structure and having connection with the elongated member at its ends for supporting such member above said plane in transverse relation to the glass supporting elements, the supported member being disposed with said faces oblique to said plane and with edge portions closely adjacent said plane to guide a cutter drawn across a supported sheet of glass, and said edges of the oblique faces being spaced above the top surface of a supported glass sheet.

15. A glass processing table comprising a frame structure, a plurality of elongated elements formed of sheet material and mounted on the structure in side by side relation, said elements each comprising a hollow tube having an integral reversely bent portion providing an upstanding flange terminating in a rounded edge extending longitudinally of the element, said elements being arranged with their rounded edges disposed substantially in a common plane for simultaneously contacting the underside of a glass sheet to support the latter, a cutter guide rigidly mounted on the frame structure and extending transversely to the glass supporting elements adjacent the ends of the latter, said cutter guide being spaced above the plane of the reversely bent glass contacting edges of the supporting elements to provide clearance between the underside of the cutter guide and a supported glass sheet, and means on the frame structure for supporting a supply stack of glass sheets to be processed said supply supporting means being remote from the cutter guide and spaced therefrom in a direction such that in being moved from the supply stack to cutting position under the cutter guide a glass sheet travels in a direction generally paralleling the supporting elements.

ROBERT C. BOWERS.

REFERENCES CITED

The following references are of record in the file of this patent:

UNITED STATES PATENTS

| Number | Name | Date |
| --- | --- | --- |
| 230,619 | Darling | Aug. 3, 1880 |
| 333,119 | Ephriam | Dec. 29, 1885 |
| 749,799 | Mitchem | Jan. 10, 1904 |
| 1,307,844 | Bennett | June 24, 1919 |
| 1,410,153 | Barbeau | Mar. 21, 1922 |
| 1,645,622 | Prince | Oct. 18, 1927 |
| 1,878,818 | Burdett | Sept. 20, 1932 |
| 1,889,501 | Schnake | Nov. 29, 1932 |
| 1,997,939 | Loucks | Apr. 16, 1935 |
| 2,123,366 | Kehr | July 12, 1938 |
| 2,312,154 | Fischer | Feb. 23, 1943 |